(12) United States Patent
Shenoy et al.

(10) Patent No.: US 12,353,749 B2
(45) Date of Patent: Jul. 8, 2025

(54) FIRMWARE SCHEME FOR 3 TIER MEMORIES

(71) Applicant: Western Digital Technologies, Inc., San Jose, CA (US)

(72) Inventors: Manoj M. Shenoy, Bangalore (IN); Lakshmi Sowjanya Sunkavelli, Bangalore (IN); Gopu S, Bengaluru (IN); Binoy Jose Panakkal, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 25 days.

(21) Appl. No.: 18/359,704

(22) Filed: Jul. 26, 2023

(65) Prior Publication Data

US 2024/0248631 A1 Jul. 25, 2024

Related U.S. Application Data

(60) Provisional application No. 63/481,274, filed on Jan. 24, 2023.

(51) Int. Cl.
*G06F 3/06* (2006.01)

(52) U.S. Cl.
CPC .......... *G06F 3/0652* (2013.01); *G06F 3/0608* (2013.01); *G06F 3/064* (2013.01); *G06F 3/0679* (2013.01)

(58) Field of Classification Search
CPC ...... G06F 3/0652; G06F 3/0608; G06F 3/064; G06F 3/0679
See application file for complete search history.

(56) References Cited

U.S. PATENT DOCUMENTS

| | | | |
|---|---|---|---|
| 10,157,680 B2 | 12/2018 | Yang et al. | |
| 10,665,301 B1* | 5/2020 | Lu | G11C 16/08 |
| 10,971,235 B2* | 4/2021 | Park | G11C 16/24 |
| 2014/0226404 A1* | 8/2014 | Lee | G11C 16/04 |
| | | | 365/185.11 |
| 2015/0370701 A1* | 12/2015 | Higgins | G06F 12/0246 |
| | | | 711/103 |
| 2017/0178736 A1* | 6/2017 | Yang | G11C 11/5628 |
| 2021/0264964 A1* | 8/2021 | Puthenthermadam | |
| | | | G11C 5/025 |
| 2023/0050955 A1* | 2/2023 | Zhao | G11C 16/0483 |
| 2024/0112743 A1* | 4/2024 | Zhang | G11C 16/24 |
| 2024/0127892 A1* | 4/2024 | Lee | G11C 11/5628 |
| 2024/0192873 A1* | 6/2024 | Yang | G06F 3/0679 |
| 2024/0203511 A1* | 6/2024 | Guo | G11C 16/3418 |

* cited by examiner

*Primary Examiner* — Ryan Bertram
(74) *Attorney, Agent, or Firm* — PATTERSON + SHERIDAN, LLP

(57) ABSTRACT

A three tier memory has an upper sub block, a lower sub block, and a middle sub block. In the present disclosure, rather than precharging the upper and lower sub blocks, use is made of the middle sub block using a firmware (FW) scheme. Upon receiving a write request from a host, the FW will route the data to the middle sub block (SB1) through reverse order programming (ROP) so that the SB1 is precharged through the source side through the lower sub block (SB0). Once the SB1 is written, data is then routed to the SB0 and then to the upper sub block (SB2). When there is a garbage collection (GC) request, the FW will move the data from the SB2 and then erase the SB2. Then the data moves from the SB0 and SB0 is erased. Finally, the data moves from the SB1 and then SB1 is erased.

19 Claims, 8 Drawing Sheets

FIRMWARE SCHEME FOR 3 TIER MEMORIES

CROSS-REFERENCE TO RELATED APPLICATIONS

This application claims benefit of U.S. Provisional Patent Application Ser. No. 63/481,274, filed Jan. 24, 2023, which is herein incorporated by reference.

BACKGROUND OF THE DISCLOSURE

Field of the Disclosure

Embodiments of the present disclosure generally relate to improved methods for sub block programing in three tier memories.

Description of the Related Art

Three-dimensional (3D) vertical flash memory cell structure (BiCS) shows an ever increasing trend for block consideration of cost reduction and non-breakable vertical stack. However, from a system perspective, large block size is not desirable because the number of blocks gets reduced, which affects the ability of the system block budget to meet capacity and management requirements. In addition, a large block size makes internal transfer much slower. If one word line (WL) is defective in a normal block, a user can still operate using the partial block, thus the user has more "good blocks" (yield recovery). Therefore, there is a strong need to reduce block size.

Sub block mode (SBM) works well in a physical 2 tier structure, where a joint structure serves as a natural separation for upper and lower sub blocks. In current SBM (2 sub block), the upper sub block is programmed using normal order program (NOP) where pre-charge is allowed from a drain side, while the lower sub block is programmed using reverse order program (ROP) where pre-charge relies on a source side. With the addition of a third sub block, creating a three-tier structure, there currently is no way to precharge the middle sub block through either the source gate or the drain gate.

Therefore, there is a need in the art for improved sub block programing in three tier memories.

SUMMARY OF THE DISCLOSURE

The present disclosure generally relates to improved methods to program three tier memories. Rather than pre-charging an upper sub block and a lower sub block, use is made of the middle sub block (SB1) using a firmware (FW) scheme. Upon receiving a write request from a host, the FW will route the data to the SB1 through reverse order programming (ROP) so that the SB1 is pre-charged through the source side through the lower sub block (SB0). Once the SB1 is written, data is then routed to the SB0 and then to the upper sub block (SB2). When there is a garbage collection (GC) request, the FW will move the data from the SB2 and then erase the SB2. Then the data moves from the SB0 and SB0 is then erased. Finally, the data moves from the SB1 and then SB1 is erased.

In one embodiment, a data storage device comprises: a memory device, wherein the memory device includes a block subdivided into an upper block, a middle block, and a lower block; and a controller coupled to the memory device, wherein the controller is configured to: receive a command to write data to the block; write data to the middle block; and write data to either the upper block or the lower block after writing data to the middle block.

In another embodiment, a data storage device comprises: a memory device, wherein the memory device includes a block subdivided into an upper block, a middle block, and a lower block; and a controller coupled to the memory device, wherein the controller is configured to: receive a command to erase data from the block; erase data from either the upper block or the lower block; and erase data from the middle block after erasing data from either the upper block or the lower block.

In another embodiment, a data storage device comprises: means to store data; and a controller coupled to the means to store data, wherein the controller is configured to: write data to a middle block of the means to store data prior to writing data to an upper block and/or a lower block of the means to store data; and erase data from the upper block and the lower block prior to erasing data from the middle block.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved methods to program three tier memories. Rather than pre-charging an upper sub block and a lower sub block, use is made of the middle sub block (SB1) using a firmware (FW) scheme. Upon receiving a write request from a host, the FW will route the data to the SB1 through reverse order programming (ROP) so that the SB1 is pre-charged through the source side through the lower sub block (SB0). Once the SB1 is written, data is then routed to the SB0 and then to the upper sub block (SB2). When there is a garbage collection (GC) request, the FW will move the data from the SB2 and then erase the SB2. Then the data moves from the SB0 and SB0 is then erased. Finally, the data moves from the SB1 and then SB1 is erased.

Figure 1:
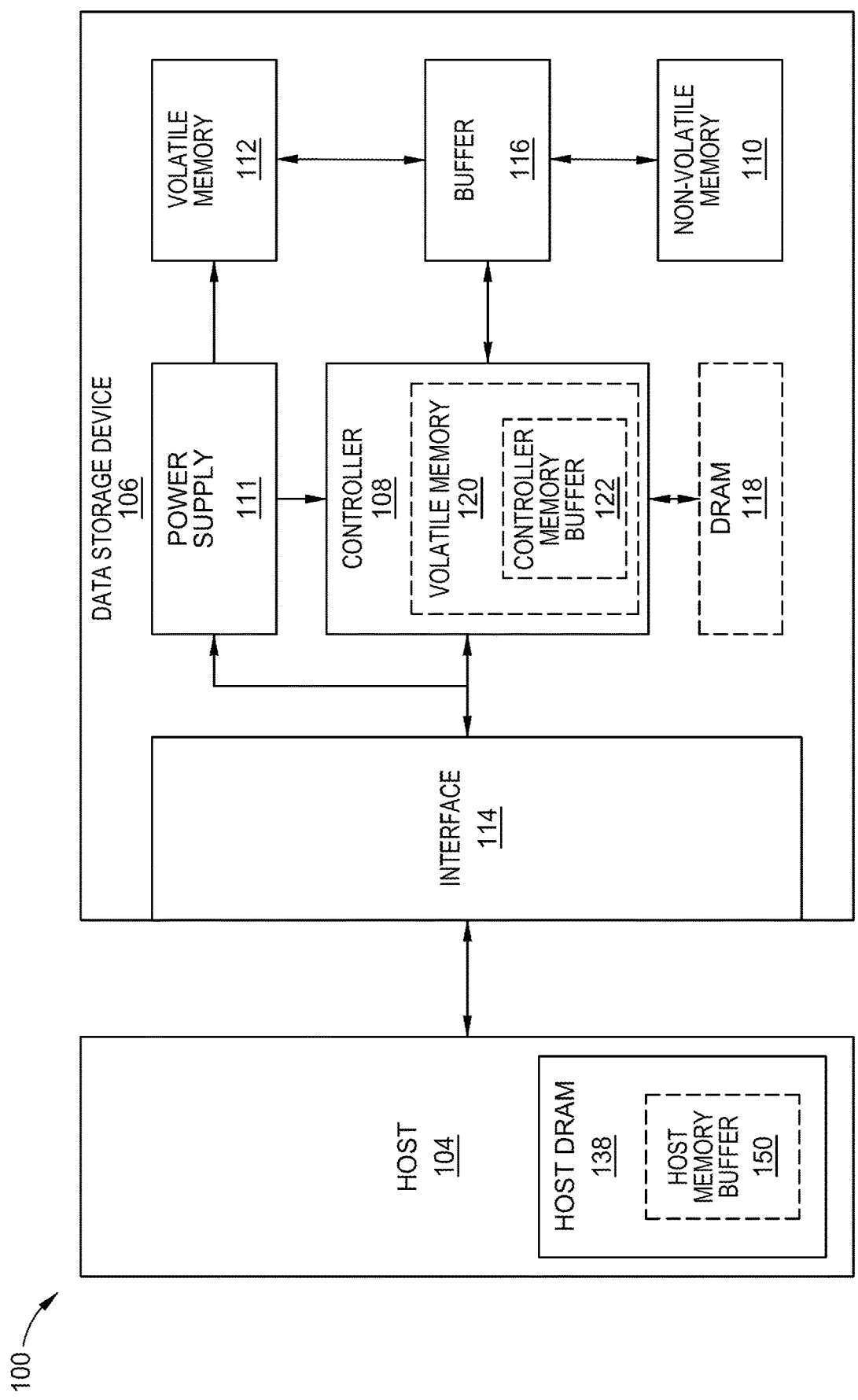
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
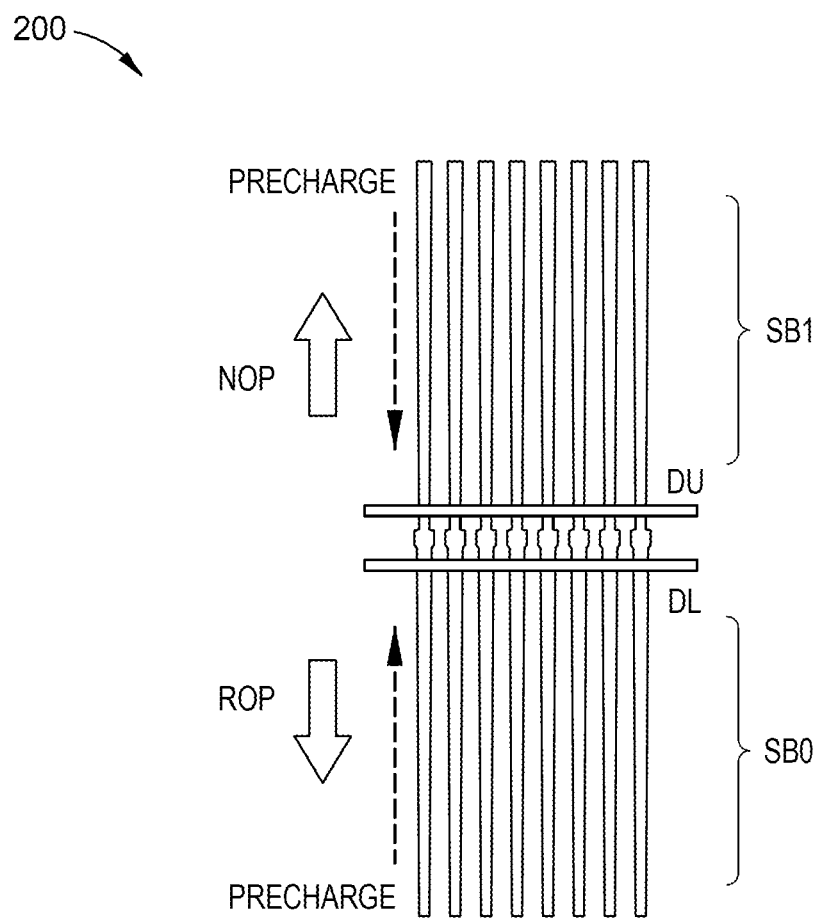
FIG. 2 depicts a two tier memory, according to certain embodiments.

FIG. 2 depicts a two tier memory 200, according to certain embodiments. The two tier memory 200 comprises a lower sub block (SB0) and an upper sub block (SB1). The SB1 is programed using NOP, while SB0 is programed using ROP.

Figure 3:
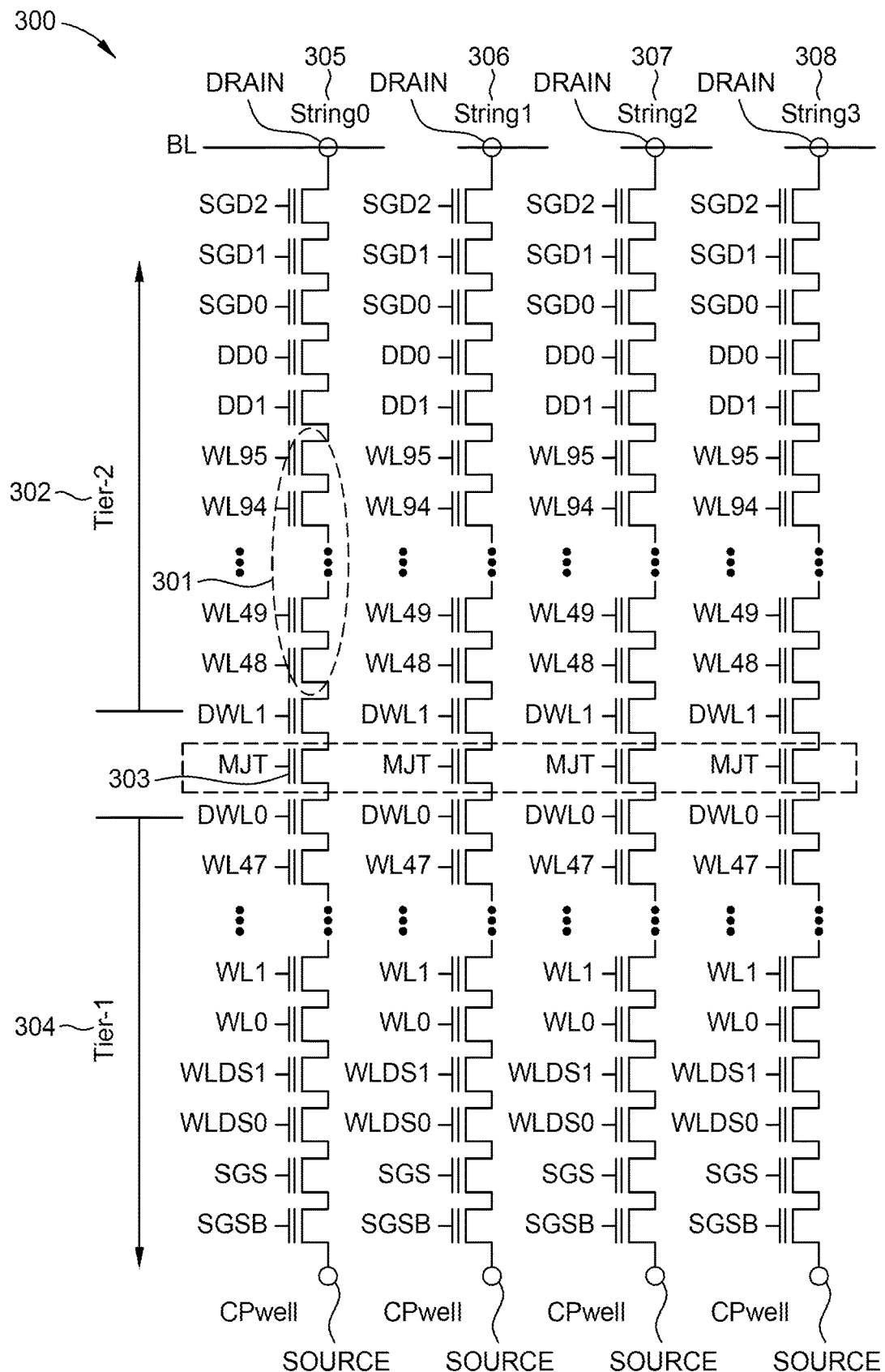
FIG. 3 depicts a four NAND strings with two tiers, according to certain embodiments.

FIG. 3 depicts one embodiment of four NAND strings 305-308 in a memory device 300 with two tiers, according to certain embodiments. Each of the NAND strings comprises a first portion of the NAND string (e.g., corresponding with a first tier 304 of memory cell transistors), a second portion of the NAND string (e.g., corresponding with a second tier 302 of memory cell transistors), and a tier select gate transistor 303 arranged between the first portion of the NAND string and the second portion of the NAND string.

The first portion of the NAND string includes memory cell transistors corresponding with word lines WL0-WL47, a memory cell transistor connected to dummy word line DWL0 and arranged between the tier select gate transistor 303. The memory cell transistor is connected to word line WL47, and the memory cell transistors are connected to the dummy word lines WLDS1 and WLDS0 and are arranged between the memory cell transistor which is connected to the word line WL0 and the source-side select gate is connected to SGS.

In one embodiment, during a programming operation for memory cells within the first tier 304, the tier select gate transistor 303 may be placed into a conducting state while the memory cells within the first tier 304 are programmed. During a subsequent programming operation for memory cells within the second tier 302, the tier select gate transistor 303 may be placed into a non-conducting state while the memory cells 301 within the second tier 302 are programmed. In this case, the channel under the memory cells within the first tier 304 may be floated. The tier select gate transistor 303 may comprise an NMOS transistor without a charge trap layer between the channel of the NMOS transistor and the gate of the NMOS transistor. In another embodiment, during an erase operation for memory cells within the second tier 302, the tier select gate transistor 303 may be placed into a non-conducting state while the memory cells within the second tier 302 are erased.

Figure 4:
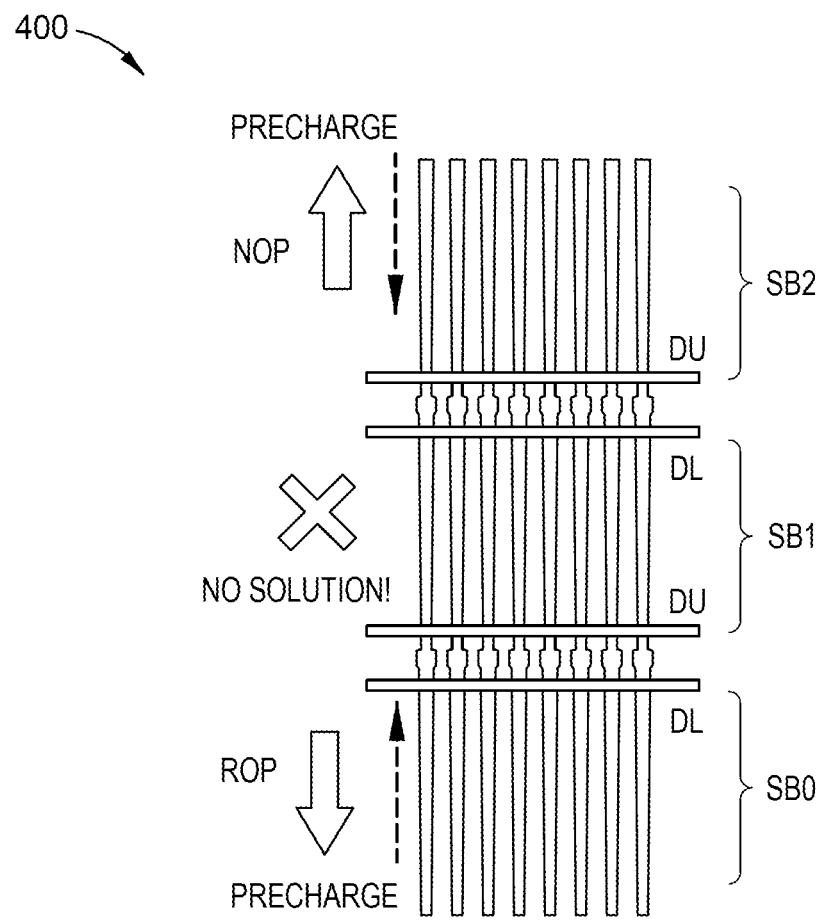
FIG. 4 depicts a three tier memory, according to certain embodiments.

FIG. 4 depicts a three tier memory 400, according to certain embodiments. The three tier memory 400 comprises a lower sub block (SB0), a middle sub block (SB1), and an upper sub block (SB2). A two sub block programming solution will not work with a three tier memory structure because the middle tier (SB1) cannot be pre-charged from a source/drain side and severe program disturb prevents implementing sub block mode. Because block size is increasing and a number of blocks are getting reduced generation by generation block budget will be a concern for the system. Hence, usage of a three tier SBM may be common to extend the two tier SBM design so that block numbers continue to reduce.

Stated another way, the SB2 is programed using NOP, while the SB0 is programed using ROP. The SB1 cannot be precharged from the source side or the drain side. To program the SB1, the user cannot precharge and maintain the same voltage margin across the three sub blocks. A method to precharge the middle sub block is needed.

As will be discussed herein, effective use of the middle sub block (SB1) can occur. Upon receiving a write request from a host device, FW will route the data into SB1 through reverse order programming so that the data gets precharged through the source side SB0. Once SB1 is written, data is then routed to SB0 and then SB2. When there is a garbage collection (GC)/relocation request for the block, the FW will move data from SB2 and erase SB2, move data from SB0 and erase SB0, and finally move data from SB1 and erase SB1.

Figure 5:
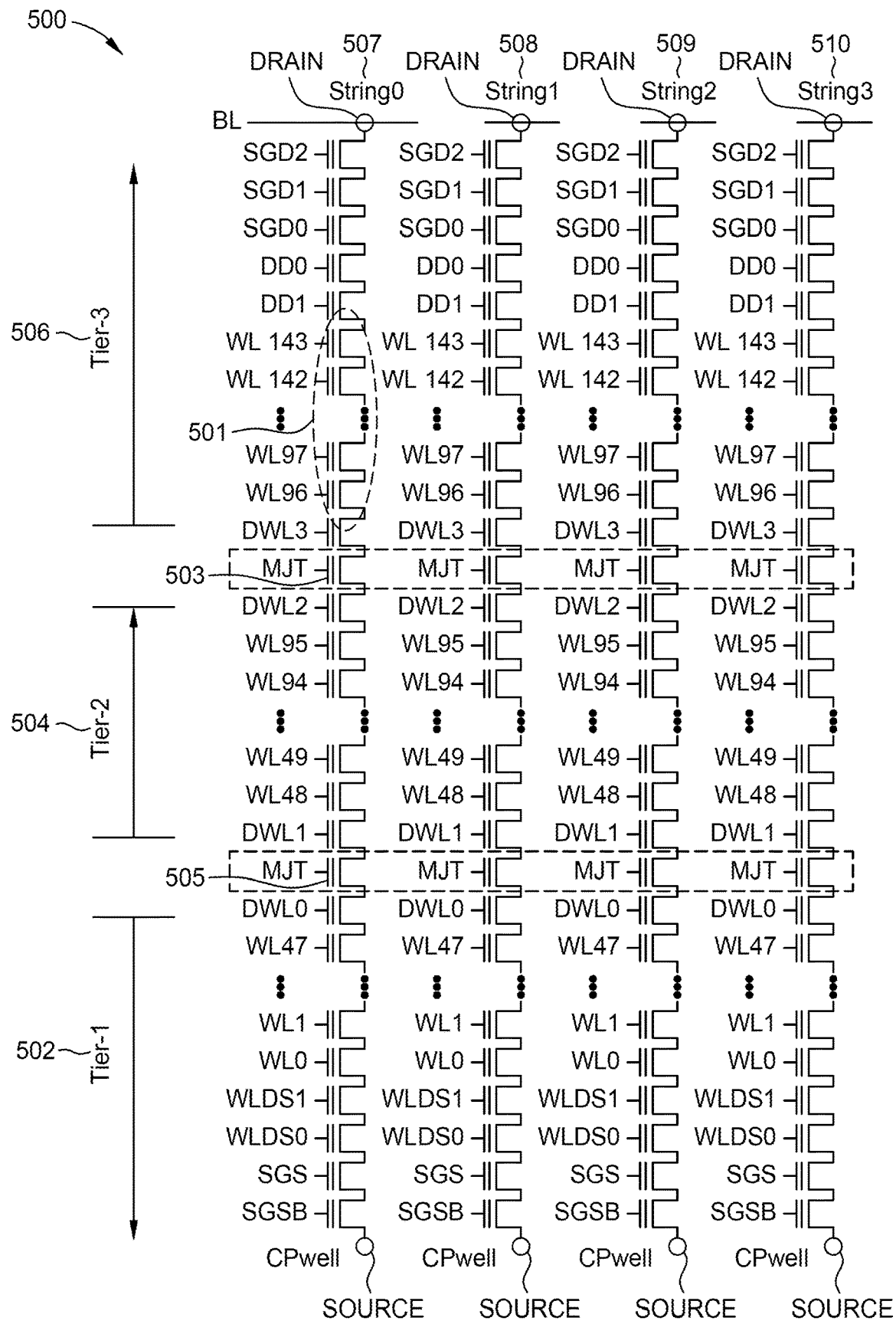
FIG. 5 depicts a four NAND strings with three tiers, according to certain embodiments.

FIG. 5 depicts one embodiment of four NAND strings 507-510 in a memory device 500 with three tiers, according to certain embodiments. Each of the NAND strings comprises a first portion of the NAND string (e.g., corresponding with a first tier of memory cell transistors 502), a second portion of the NAND string (e.g., corresponding with a second tier of memory cell transistors 504), a third portion of the NAND string (e.g., corresponding with a third tier of memory cell transistors 506), a first tier select gate transistor 503 arranged between the second portion of the NAND string and the third portion of the NAND string, a second tier select gate transistor 505 arranged between the first portion of the NAND string and the second portion of the NAND string. The first portion of the NAND string includes memory cell transistors corresponding with word lines WL0-WL47, a first memory cell transistor connected to dummy word line DWL0 and arranged between the tier select gate transistor 505. The memory cell is transistor connected to word line WL47, and memory cell transistors are connected to dummy word lines WLDS1 and WLDS0 and arranged between the memory cell transistor which is connected to word line WL0 and the source-side select gate is connected to SGS.

The second portion of the NAND string includes memory cell transistors corresponding with word lines WL48-WL95, a second memory cell transistor connected to dummy word line DWL2 and arranged between the tier select gate transistor 503. The memory cell transistor is connected to word line WL95. The third portion of the NAND string includes memory cell transistors corresponding with word lines WL96-WL143, a second memory cell transistor connected to dummy word line DWL3 and arranged between the tier select gate transistor 503. The memory cell transistor is connected to word line WL96.

Figure 6:
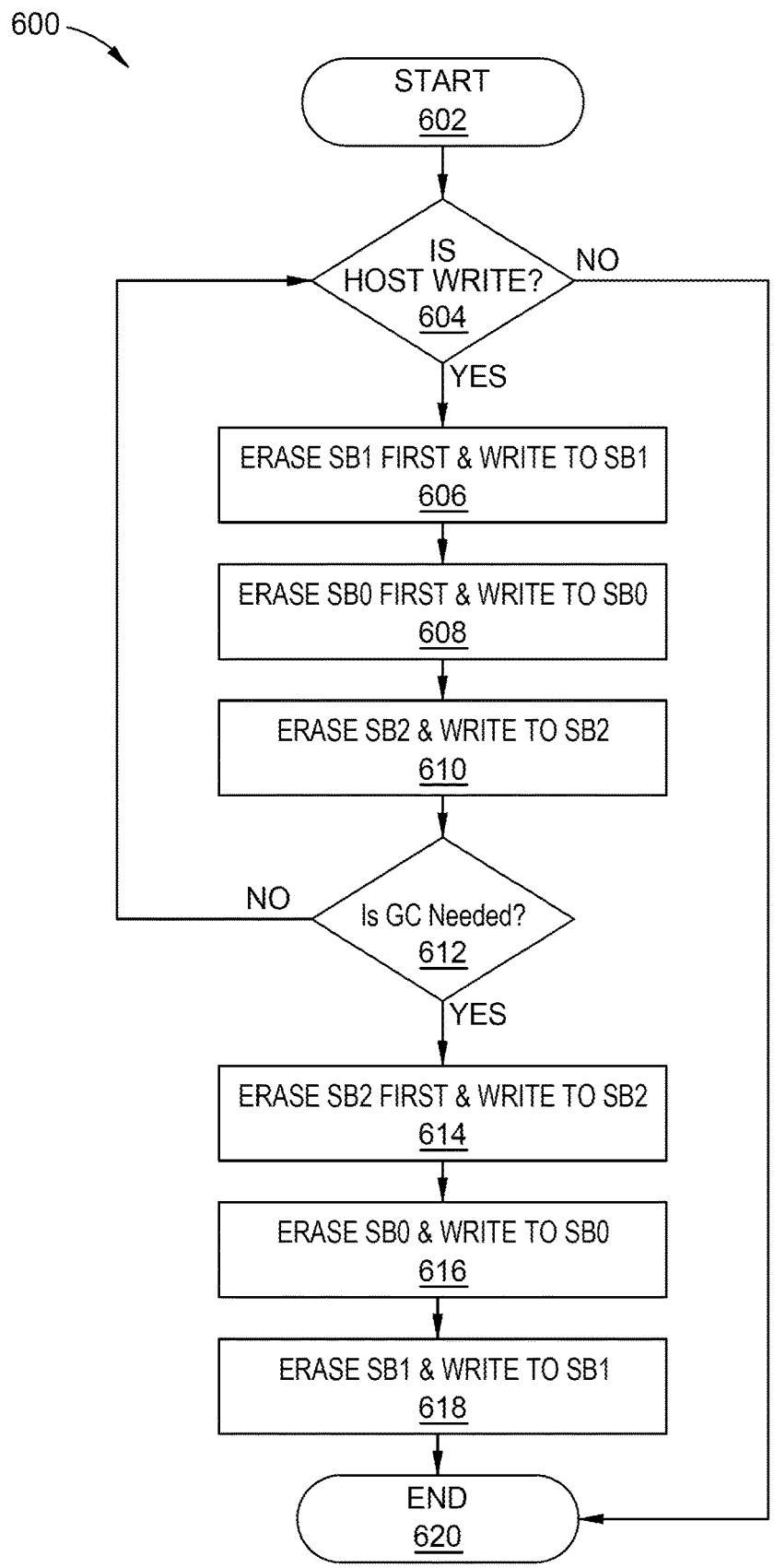
FIG. 6 is a flow chart illustrating a method for proposed Firmware (FW), according to certain embodiments.

FIG. 6 is a flow chart illustrating a method 600 for proposed FW, according to certain embodiments. The method 600 starts at block 602. At block 604, the controller such as the controller 108 of FIG. 1 determines if there is a host write command. If the controller determines there is not a host write command then the method 600 proceeds to block 620 to end the method 600. If the controller determines that there is a host write command then the method 600 proceeds to block 606. At block 606, the controller first erases the SB1 and then writes to the SB1. At block 608, the controller erases the SB0 and then writes to the SB0. At block 610, the controller erases the SB2 and then writes to the SB2. It is to be understood that even though in this embodiment the controller writes to the SB0 before writing to the SB2, the controller can write to the SB2 before writing to the SB0. If there is a write command, the write to the SB1 should always be before the write to both the SB0 and the SB2 are executed. At block 612, the controller determines whether GC is needed. If the controller determines that GC is not needed then the method 600 returns to block 604. If the controller determines that GC is needed then the method 600 proceeds to block 614. Once garbage collection is determined to be needed then an erase occurs in all the SB's. When an erase command is initiated, the SB1 must be erased last or after both the SB2 and SB0 have been erased. The FW will handle the data movement for both write commands and erase commands. At block 614 the controller erases the SB2 and then writes to the SB2. At block 616, the controller erases the SB0 and then writes to the SB0. At block 618, the controller erases the SB1 and then writes to the SB1. At block 620, the method 600 ends.

Figure 7:
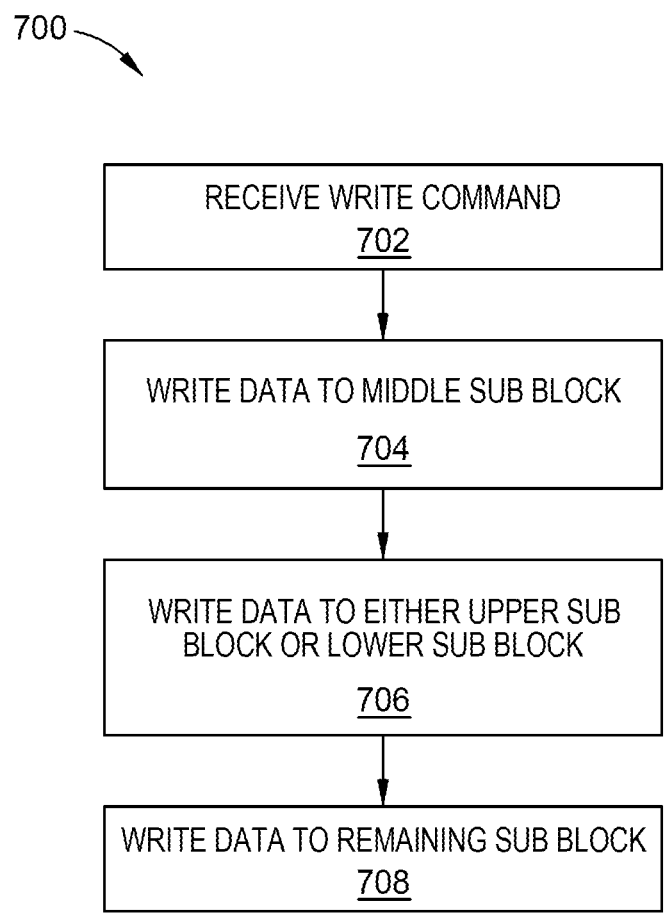
FIG. 7 is a flow chart illustrating a method for proposed flow of a write command, according to certain embodiments.

FIG. 7 is a flow chart illustrating a method 700 for proposed flow of a write command, according to certain embodiments. The method 700 begins at 702. At block 702, the controller such as the controller 108 of FIG. 1 receives a write command. At block 704, the controller writes data to the middle sub block or tier 2 such as SB1 of FIG. 4. At block 706, the controller writes data to either the upper sub block such as SB2 of FIG. 4 or the lower sub block such as SB1 of FIG. 4. At block 708, the controller writes data to the remaining sub block.

Figure 8:
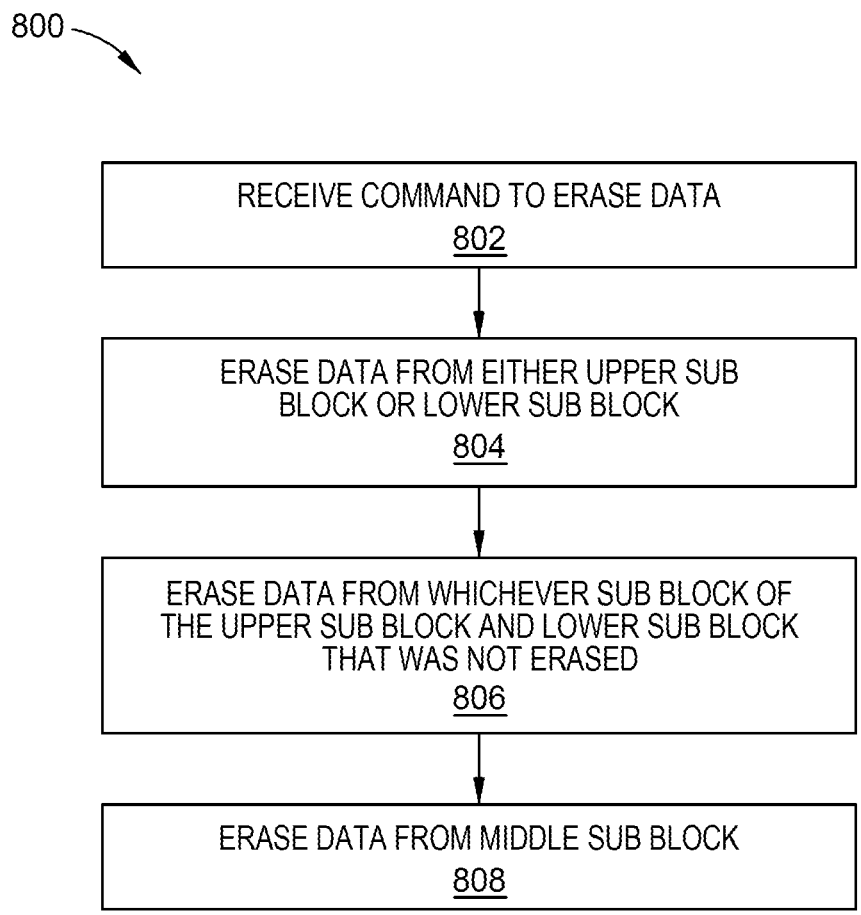
FIG. 8 is a flow chart illustrating a method for proposed flow of an erase command, according to certain embodiments.

FIG. 8 is a flow chart illustrating a method 800 for proposed flow of an erase command, according to certain embodiments. The method 800 begins at 802. At block 802, the controller such as the controller 108 of FIG. 1 receives a command to erase data. At block 804, the controller erase data from the upper sub block such as SB2 of FIG. 4 or the lower sub block such as SB1 of FIG. 4. At block 806, the controller erases data from whichever sub block of the upper sub block and lower block that was not erased in block 804. At block 808, the controller erases the data from the middles sub block or tier 2 such as SB1 of FIG. 4.

By using a third partial block in the system, the block budget is improved. The memory structure is put into good use without compromising the design. With this logic, more tiers for future BiCS specifications can be accommodated without compromising on the design.

In one embodiment, a data storage device comprises: a memory device, wherein the memory device includes a block subdivided into an upper block, a middle block, and a lower block; and a controller coupled to the memory device, wherein the controller is configured to: receive a command to write data to the block; write data to the middle block; and write data to either the upper block or the lower block after writing data to the middle block. The controller is configured to determine whether the command is a host write command. The controller is configured to erase the middle block and write data to the middle block. The controller is configured to erase the upper block and write data to the upper block.

The controller is configured to erase the lower block and write data to the lower block. The controller is configured to determine whether garbage collection is needed. The controller is configured to relocate data from either the upper block or the lower block and then erase either the upper block or the lower block. The controller is configured to relocate data from the middle block and then erase the middle block, wherein the relocating occurs after both the upper block and lower block have been relocated and erased. The controller is configured to erase data from both the upper block and the lower block prior to easing data from the middle block. Upon receiving the command to write data, the controller is configured to route data into the middle block through reverse order programming to pre-charge the middle block through a source side of a transistor through the lower block. The controller is configured to route data through the middle block to the upper block.

In another embodiment, a data storage device comprises: a memory device, wherein the memory device includes a block subdivided into an upper block, a middle block, and a lower block; and a controller coupled to the memory device, wherein the controller is configured to: receive a command to erase data from the block; erase data from either the upper block or the lower block; and erase data from the middle block after erasing data from either the upper block or the lower block. The erasing data from the middle block occurs after erasing data from both the upper block and the lower block. At least one first select gate transistor disposed between the middle block and the upper block. At least one second select gate transistor disposed between the middle block and the lower block. The middle block is coupled to a source electrode of the at least one first select gate transistor. The middle block is coupled to a drain electrode of the at least one second select gate transistor.

In another embodiment, a data storage device comprises: means to store data; and a controller coupled to the means to store data, wherein the controller is configured to: write data to a middle block of the means to store data prior to writing data to an upper block and/or a lower block of the means to store data; and erase data from the upper block and the lower block prior to erasing data from the middle block. The controller is configured to erase data upon determining that a garbage collection operation is needed. Prior to writing data to the middle block, data is erased from the middle block.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device, wherein the memory device includes a block subdivided into an upper block, a middle block, and a lower block, wherein:
the lower block is located on a first tier of memory cell transistors of the block;
the middle block is located on a second tier of memory cell transistors of the block; and
the upper block is located on a third tier of memory cell transistors of the block, and wherein a first tier select gate transistor is arranged between the first and the second tiers of memory cell transistors and a second tier select gate transistor is arranged between the second and the third tiers of memory cell transistors; and a controller coupled to the memory device, wherein the controller is configured to:
receive a command to write data to the block;
write data to the middle block;
write data to either the upper block or the lower block after writing data to the middle block; and
erase data from both the upper block and the lower block prior to erasing data from the middle block.

2. The data storage device of claim 1, wherein the controller is configured to determine whether the command is a host write command.

3. The data storage device of claim 1, wherein the controller is configured to erase the middle block and write data to the middle block.

4. The data storage device of claim 3, wherein the controller is configured to erase the upper block and write data to the upper block.

5. The data storage device of claim 4, wherein the controller is configured to erase the lower block and write data to the lower block.

6. The data storage device of claim 1, wherein the controller is configured to determine whether garbage collection is needed.

7. The data storage device of claim 1, wherein the controller is configured to relocate data from either the upper block or the lower block and then erase either the upper block or the lower block.

8. A data storage device, comprising:
a memory device, wherein the memory device includes a block subdivided into an upper block, a middle block, and a lower block, wherein:
the lower block is located on a first tier of memory cell transistors of the block;
the middle block is located on a second tier of memory cell transistors of the block; and
the upper block is located on a third tier of memory cell transistors of the block, and wherein a first tier select gate transistor is arranged between the first and the second tiers of memory cell transistors and a second tier select gate transistor is arranged between the second and the third tiers of memory cell transistors; and
a controller coupled to the memory device, wherein the controller is configured to:
receive a command to write data to the block;
write data to the middle block;
write data to either the upper block or the lower block after writing data to the middle block;
relocate data from either the upper block or the lower block and then erase either the upper block or the lower block; and
relocate data from the middle block and then erase the middle block, wherein relocating data from the middle block occurs after both the upper block and lower block have been relocated and erased.

9. The data storage device of claim 1, wherein upon receiving the command to write data, the controller is configured to route data into the middle block through reverse order programming to pre-charge the middle block through a source side of a transistor through the lower block.

10. The data storage device of claim 9, wherein the controller is configured to route data through the middle block to the upper block.

11. A data storage device, comprising:
a memory device, wherein the memory device includes a block subdivided into an upper block, a middle block, and a lower block, wherein:

the lower block is located on a first tier of memory cell transistors of the block;

the middle block is located on a second tier of memory cell transistors of the block; and the upper block is located on a third tier of memory cell transistors of the block, and wherein a first tier select gate transistor is arranged between the first and the second tiers of memory cell transistors and a second tier select gate transistor is arranged between the second and the third tiers of memory cell transistors; and a controller coupled to the memory device, wherein the controller is configured to:

receive a command to erase data from the block;

erase data from either the upper block or the lower block; and erase data from the middle block after erasing data from either the upper block or the lower block.

12. The data storage device of claim 11, wherein the erasing data from the middle block occurs after erasing data from both the upper block and the lower block.

13. The data storage device of claim 11, further comprising at least one first select gate transistor disposed between the middle block and the upper block.

14. The data storage device of claim 13, further comprising at least one second select gate transistor disposed between the middle block and the lower block.

15. The data storage device of claim 14, wherein the middle block is coupled to a source electrode of the at least one first select gate transistor.

16. The data storage device of claim 15, wherein the middle block is coupled to a drain electrode of the at least one second select gate transistor.

17. A data storage device, comprising:

means to store data, wherein the means to store data includes a block subdivided into an upper block, a middle block, and a lower block, wherein the lower block is located on a first tier of memory cell transistors of the block;

the middle block is located on a second tier of memory cell transistors of the block; and the upper block is located on a third tier of memory cell transistors of the block, and wherein a first tier select gate transistor is arranged between the first and the second tiers of memory cell transistors and a second tier select gate transistor is arranged between the second and the third tiers of memory cell transistors, and wherein the first and second select gate transistors comprise an N-channel Metal-Oxide-Semiconductor (NMOS) transistor; and a controller coupled to the means to store data, wherein the controller is configured to:

write data to the middle block of the means to store data prior to writing data to either the upper block or the lower block of the means to store data; and erase data from the upper block and the lower block prior to erasing data from the middle block.

18. The data storage device of claim 17, wherein the controller is configured to erase data upon determining that a garbage collection operation is needed.

19. The data storage device of claim 17, wherein prior to writing data to the middle block, data is erased from the middle block.

* * * * *